3,321,362
INSECT CHEMOSTERILANT 3 - SUBSTITUTED - 2-OXOBUTYRALDEHYDE BIS(THIOSEMICARBAZONES), THEIR ALKALI METAL SALTS, AND THEIR METAL CHELATES
Alan J. Lemin, Richland Township, Kalamazoo County, Mich., assignor to The Upjohn Company, Kalamazoo, Mich., a corporation of Delaware
No Drawing. Filed Feb. 15, 1965, Ser. No. 432,824
12 Claims. (Cl. 167—22)

This invention pertains to a novel biological process and to novel compositions. The invention is more particularly directed to the novel biological process—controlling insect pests with 3-substituted-2-oxobutyraldehyde bis(thiosemicarbazones); and to novel compositions—3-substituted-2-oxobutyraldehyde bis(thiosemicarbazones) in a foodstuff for insects.

The 3 - substituted - 2 - oxobutyraldehyde bis(thiosemicarbazones) active principle of the process and the compositions of this invention have the following general structural formula:

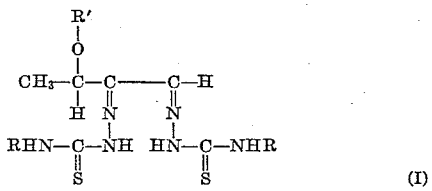

wherein R is selected from the group consisting of hydrogen and methyl, and R' is selected from the group consisting of hydrogen, methyl, ethyl, propyl, isopropyl, acetyl, propionyl, butyryl, and isobutyryl. The compounds according to Formula I are also effective in the forms of their alkali metal salts and their metal chelates.

In accordance with the invention, it has now been found that 3-substituted-2-oxobutyraldehyde bis(thiosemicarbazones), as defined in Formula I (including alkali metal salts and metal chelates), are poisonous to insects. The compounds do not necessarily kill insects at dosages contemplated by the process of this invention, but they do act as a poison to the reproductive system of insects and cause the poisoned insects to lay eggs which do not hatch.

This new discovery provides a novel means for controlling insect pests by preventing their reproduction. When insects are rendered reproductively sterile with 3-substituted-2-oxobutyraldehyde bis(thiosemicarbazones) (compounds according to Formula I and alkali metal salts and metal chelates thereof) the females either fail to lay eggs or the eggs that are laid do not hatch. In the course of time, the adult insects age and die, the number of reproducing individuals become too small to maintain pestiferous populations, and control is thus achieved.

The insect chemosterilant efficacy of 3-substituted-2-oxobutyraldehyde bis(thiosemicarbazone) varies according to the susceptibility of various insects to given amounts of the compounds. Some insects are sterilized by relatively small amounts of the compounds, and for practical economic reasons it is preferable to use no more than the relatively small amounts sufficient for sterilization. So used, a pestiferous population of insects is not wiped out; but reproduction is suppressed and succeeding generations are significantly reduced in numbers. Persistent use of the chemosterilant will result in control of undesirable pests.

The 3-substituted-2-oxobutyraldehyde bis(thiosemicarbazones), according to Formula I including their alkali metal salts and metal chelates, are active in low concentrations against mites, flies, mosquitoes, thrips, bean beetles, aphids, army worms, salt marsh caterpillars and other lepidopterous larvae. As used herein, the term "insect" is used in the same sense as in the Federal Insecticide, Fungicide, and Rodenticide Act of 1947 and refers generally to animals comprising the phylum Arthropoda, illustratively, class Insecta, for example, orders Isoptera, Thysanoptera, Mallophaga, Hemiptera, Anoplura, Homoptera, Coleoptera, Lepidoptera, Orthoptera, Diptera, and Hymenoptera; and class Arachnida, for example, orders Araneae and Acarina.

The 3-substituted-2-oxobutyraldehyde bis(thiosemicarbazones) of Formula I are known compounds. They are prepared by reacting a thiosemicarbazide and a 3-substituted-2-oxobutyraldehyde, wherein the 3-substituent is a member selected from the group consisting of hydroxy, methoxy, ethoxy, propoxy, isopropoxy, acetoxy, propionyloxy, butyryloxy, and isobutyryloxy. The starting aldehydes are known. The thiosemicarbazide is reacted with the aldehyde in the presence of an inert solvent medium. Preferably, the molar ratio of thiosemicarbazide to aldehyde is at least 2:1. Suitable inert solvent media include water, dimethylformamide, ethanol, and the like, including mixtures thereof and water acidified with weak acids, e.g., acetic acid (preferred). The 3-substituted-2-oxobutyraldehyde bis(thiosemicarbazone) is recovered by conventional procedures, e.g., by removing the solvent medium, washing and drying, and recrystallizing if so desired. Alkali metal salts are prepared by neutralizing the 3-substituted-2-oxobutyraldehyde bis(thiosemicarbazone) with, for example, alkali metal alkoxides such as sodium methoxide, potassium ethoxide, and the like carried out under anhydrous conditions in alcoholic media, e.g., methanol, ethanol, and the like.

The metal chelates of 3-substituted-2-oxobutyraldehyde bis(thiosemicarbazones) are prepared by dissolving a 3-substituted-2-oxobutyraldehyde bis(thiosemicarbazone) in an inert solvent (methanol preferred) and adding a soluble metal salt dissolved in like solvent.

In accordance with the process of the invention, insects are poisoned with 3-substituted-2-oxobutyraldehyde bis(thiosemicarbazones) including the alkali metal salts and metal chelates by means of direct topical applications, ingestion, or residual contact. The compound can be used as a sterilant in its pure form, but for practical purposes it is preferred that the process be effected with formulations of a 3-substituted-2-oxobutyraldehyde bis(thiosemicarbazone) according to the invention.

Insects susceptible to poisoning with 3-substituted-2-oxobutyraldehyde bis(thiosemicarbazones) are readily controlled by spraying or dusting them directly or by spraying or dusting plants, objects, or other environs where they feed, hide, congregate, or mate. For this purpose aqueous mixtures, organic solutions, dusts, wettable powders, emulsifiable concentrates, granular formulations and other formulations readily eaten by or applicable to insects are contemplated as useful embodiments for effecting the process of the invention. Aqueous mixtures and organic solutions of 3-substituted-2-oxobutyraldehyde bis(thiosemicarbazones) can be readily prepared by mixing the compound or organic solutions of the compound with water or dissolving in a polar organic solvent such as methanol, ethanol, ethylene dichloride, and the like.

It is usually desirable, particularly in the case of aqueous spray formulations, to include adjuvants sucs as wetting agents, spreading agents, dispersing agents, stickers or adhesives, and the like, in accordance with usual agricultural practices. Any of the conventional wetting and dispersing agents of the anionic, cationic, and nonionic types that are commonly employed in compositions for application to plants can be used. Surfactants having sufficient wetting activity and therefore being suitable for the compositions of this invention include alkyl sulfates and sulfonates, alkyl and aryl sulfonates, sulfosuccinate esters, polyoxyethylene sulfates, polyoxyethylenesorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will preferably be used in the form of their soluble salts, e.g., sodium salts. All of these surfactants are capable of reducing the surface tension of water to less than about 40 dynes per centimeter in concentrations of about 1% or less.

Suitable stickers or adhesives include albumin, calcium caseinate, alkylphenoxy polyoxyethylene ethanol (Hyonic PE–50), coconut oil fatty acid modified phthalic polyglycerol copolymer (Triton B–1956), and the like.

Dusts are prepared by dispersing a 3-substituted-2-oxobutyraldehyde bis(thiosemicarbazone) in an inert dusting power such as a pyrophyllite, diatomite, clays such as bentonite, Georgia clay, attapulgus clay, Barden clay, wood or walnut shell flour, and the like. Dusting powder is understood to be a solid material comminuted so that it has an average particle size of less than 50 microns, advantageously, less than 15 microns. The amount of the 3-substituted-2-oxobutyraldehyde bis(thiosemicarbazone) active ingredient suitably present in a dusting formulation can vary advantageously from about 0.05% to about 90% by weight, preferably about 0.1% to about 10%, by weight. Illustratively, a dusting powder is obtained by mixing approximately equal parts of the active ingredient and pyrophyllite, comminuting either before or after the admixture as desired.

A wettable powder suitable for dispersing in an aqueous vehicle is obtained by adding a surfactant to a dusting powder. Suitable surfactants include sodium lauryl sulfate, sodium and calcium lignosulfonates, 1-tetradecyl-4-methylpyridinium chloride, Triton X–100 (isooctylphenoxy polyethoxy ethanol), and Pluronic F–68 (ethylene oxide-propylene glycol condensate, nonionic surfactant). If desired, the surfactant can be incorporated in the dry mixture either by dry milling or by adding it in solution in a volatile solvent such as ethanol or acetone, mixing to form a paste, drying, and milling. A wettable powder containing about 50% by weight of active ingredient is preferred.

For convenience in handling, the 3-substituted-2-oxobutyraldehyde bis(thiosemicarbazones) can be formulated with or without adjuvants in the form of concentrated solutions in a solvent, for example, ethyl acetate, dimethylformamide, dimethylacetamide, dimethyl sulfoxide, acetonitrile, cyclohexanone, and similar polar solvents. Such concentrates can be dispersed in a suitable volume of an aqueous medium in the presence of a surfactant such as those disclosed above to give a mixture of any desired concentration. The surfactant can be included in a concentrated solution of the active ingredient in a solvent to give an emulsifiable concentrate, or it can be added separately when the aqueous dispersion is being prepared.

For the most part, low concentrations of 3-substituted-2-oxobutyraldehyde bis(thiosemicarbazones) are effective, and the concentration in formulations for direct application can range from about 50 to about 10,000 p.p.m. For example, excellent sterilizing action on recently emerged house flies, *Musca domestica* Linnaeus, has been obtained using concentrations of active ingredient ranging from about 100 to 500 p.p.m. For example, an emulsifiable concentrate comprising 5% (by weight) of the compound can be admixed with an aqueous medium in the proportions of two teaspoonfuls (about 10 cc.) of concentrate with one gallon of medium to give a mixture containing 120 to 150 parts of active ingredients per million parts of water. Similarly, three pints of a 5% concentrate mixed with 100 gals. of water provides about 180 p.p.m. of active ingredient. In the same manner, more concentrated solutions of active ingredient in a solvent can be incorporated with an appropriate quantity of an aqueous medium or petroleum base carrier, e.g. summer oil, kerosene, 70 second superior oil, and like vehicles, to give a dispersible mixture of desired concentration.

A suitable wettable powder formulation is obtained by blending an milling 327 lbs. of Georgia clay, 4.5 lbs. of Triton X–100 as a wetting agent, 9 lbs. of a polymerized sodium salt of a substituted benzoid long-chain sulfonic acid (Daxad 27) as a dispersing agent, and 113 lbs. of a 3-substituted-2-oxobutyraldehyde bis(thiosemicarbazone). The resulting formulation has the following percentage composition (parts herein are by weight unless otherwise specified):

| | Percent |
|---|---|
| 3-substituted-2-oxobutyraldehyde bis(thiosemicarbazone) | 25 |
| Triton X–100 | 1 |
| Daxad 27 | 2 |
| Georgia clay | 72 |

This formulation, when dispersed in water at one pound per 100 gals., gives a spray formulation containing about 0.03% (300 p.p.m.) active ingredient.

A suitable emulsifiable concentrate is obtained by admixing the following materials:

| | Parts |
|---|---|
| 3-substituted-2-oxobutyraldehyde bis(thiosemicarbazone) | 15 |
| Xylene | 81.5 |
| Dodecylbenzene sodium monosulfonate | 1.75 |
| Condensation product of one mole of octylphenol and about 12 moles of ethylene oxide | 1.75 |

The mixture of dodecylbenzene sodium monosulfonate and condensation product is added to the xylene, and the 3-substituted-2-oxobutyraldehyde bis(thiosemicarbazone) is then added. This formulation, when dispersed in water at the rate of one pint per 100 gals., gives a spray formulation containing about 0.02% (200 p.p.m.) active ingredient.

3 - substituted - 2-oxobutyraldehyde bis(thiosemicarbazones) can also be formulated in relatively dilute proportions in a dispersible carrier for household applications. Thus, the compounds can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects, the particular insect to be controlled, characteristics of the particular plants being treated, the degree of development of the plants, prevailing weather conditions, such as temperature, relative humidity, rainfall, dews, and so forth.

A preferred method for effecting the reproductive sterility in accordance with the invention employs a novel formulation comprising a solid or liquid carrier diluent for the 3-substituted-2-oxobutyraldehyde bis(thiosemicarbazone) comprising an insect nutriment or food which stimulates insects to ingest the formulation and coincidently the active ingredient. If desired, the insect nutriment or food may suitably constitute the whole or substantial part of the carrier diluent. Granulated corn meal, bran, pomace, granulated sugar, and the like are suitable solid carrier diluents. Corn syrup, honey, molasses, and the like are suitable liquid carriers. Illustrative carrier diluents include one prepared by mixing 4 parts granulated sugar and 1 part orange juice crystals, and another prepared by mixing 6 parts powdered milk, 6 parts sugar, and 1 part powdered egg.

In general, suitable insect nutriments or foods for carrier diluents include carbohydrates, for example, sugars such as lactose, sucrose, fructose, glucose, and the like, and polymerized sugars such as starches, dextrins, pectins, and the like, and plant and animal proteins or protein degradation products such as egg albumen, meats, soybeans oil meal, cottage cheese, proteoses, peptones, peptides, and the like.

The formulations of this invention containing insect nutriments or food for ingestion by insects may also be or contain an insect attractant for luring insects to the formulation containing the active ingredient. Suitable attractants include sec-butyl 6-methyl-3-cyclohexene-1-carboxylate (for Mediterranean fruit fly), sec-butyl 4(or 5) - chloro-6-methylcyclohexanecarboxylate, methyleugenol, 4-(p-acetoxyphenyl)-2-butanone, anisylacetone, and the like.

The following examples are illustrative of the process and compositions of the present invention, but they are not to be construed as limiting.

PREPARATION 1.—PREPARATION OF 3-ETHOXY-2-OXOBUTYRALDEHYDE BIS(THIOSEMICARBAZONE) AND DISODIUM SALT THEREOF

PART A.—PREPARATION OF 3-ETHOXY-2-OXOBUTYRALDEHYDE BIS(THIOSEMICARBAZONE)

A solution of 13.6 g. (0.15 mole) of thiosemicarbazide in 500 ml. of water at a temperature of about 45° C. was mixed with an aqueous solution prepared by dissolving 7.4 g. (0.05 mole) of 3-ethoxy-2-oxobutyraldehyde monohydrate in 25 ml. of water. After stirring for one hr., a gummy precipitate began to form. During the second hr. of stirring, white crystals began to form. Stirring was continued for 5 hrs. The crystals were recovered on a filter, washed with hot water, and dried at 50° C. under reduced pressure. The dried crystals were dissolved in 400 ml. of boiling ethanol, and the solution was cooled to about 25° C. The long, yellow-tan needles of 3-ethoxy-2-oxobutyraldehyde bis(thiosemicarbazone) that separated were recovered on a filter, washed with 10 ml. of 50% aqueous ethanol, and dried at 55° C. under reduced pressure; M.P. 204° to 206° C.

*Analysis.*—Calc'd for $C_8H_{16}N_6OS_2$: C, 34.76; H, 5.84; S, 23.20. Found: C, 35.44; H, 5.56; S, 23.49.

PART B.—PREPARATION OF DISODIUM SALT OF 3-ETHOXY-2-OXOBUTYRALDEHYDE BIS(THIOSEMICARBAZONE)

A solution of 276 mg. (1 millimole) of 3-ethoxy-2-oxobutyraldehyde bis(thiosemicarbazone) in 1.5 ml. of dimethylacetamide was mixed with a solution of 130 mg. (2.4 millimoles) of sodium methoxide in 5 ml. of absolute methanol. The resulting orange-colored mixture was diluted with 100 ml. of diethyl ether, and a precipitate formed. The precipitate was collected on a filter, washed with ether, and dried to give 275 mg. (90% yield) of the disodium salt of 3-ethoxy-2-oxobutyraldehyde bis(thiosemicarbazone).

*Analysis.*—Calc'd for $C_8H_{14}N_6Na_2OS_2$: Na, 14.35. Found: Na, 13.8.

PREPARATION 2. — PREPARATION OF 3-METHOXY - 2 - OXOBUTYRALDEHYDE BIS(THIOSEMICARBAZONE

PART A

A quantity, 1.42 g. (0.0065 mole), of 3-methoxy-2-oxobutyraldehyde-sodium bisulfite complex

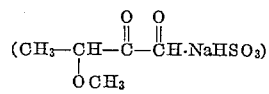

was dissolved in dilute aqueous acetic acid (25 ml. water plus 2 ml. glacial acetic acid). The solution was heated to 65° C., nitrogen gas was bubbled into the heated solution for 15 min. in order to remove sulfur dioxide, and then a solution of 1.5 g. (0.0165 mole) of thiosemicarbazide in 25 ml. of water at 60° C. was added. The reaction mixture was heated at 60° C. for 30 min., allowed to cool to about 25° C., and then set aside for 16 hrs. The crystalline product thus obtained was collected on a filter, and washed with 20 ml. of cold water and with 20 ml. of a mixture of methanol and ether (1:9). The washed filter cake was dried to give 1.09 g. (65% yield) of 3 - methoxy - 2 - oxobutyraldehyde bis(thiosemicarbazone). The ether washes were saved (Part C).

PART B

An aqueous solution (1.37 g.; 0.0058 mole) of 3-methoxy-2-oxobutyraldehyde in 1.0 ml. of water (58% solution w./v.) was added to 20 ml. of 10% aqueous ethanol and the mixture was added to 25 ml. of water containing 1.1 g. (0.012 mole) of thiosemicarbazide. The reaction mixture was heated at 60° C. for 30 min., and allowed to cool to about 25° C. before setting aside for 16 hrs. The crystals that formed were collected on a filter, washed with 20 ml. of water, and washed with 20 ml. of a mixture of ethanol and ether (1:9). The washed crystals were dried to give 0.54 g. (34% yield) of 3-methoxy-2-oxobutyraldehyde bis(thiosemicarbazone). The ether washes were saved (Part C).

PART C

The ether washes from Parts A and B were combined and evaporated to dryness. There was thus obtained an additional 300 mg. of 3-methoxy-2-oxobutyraldehyde bis(thiosemicarbazone).

PART D

For recrystallization, 0.97 g. of 3-methoxy-2-oxobutyraldehyde bis(thiosemicarbazone) from Part A, 0.42 g. from Part B, and 0.25 g. from Part C were dissolved in 80 ml. of boiling methanol; the methanol solution was filtered, and the filtrate was mixed with 80 ml. of water. The aqueous methanol solution was set aside for 16 hrs. at 25° C., and then refrigerated (about 5° C.) for 24 hrs. The crystals that formed were collected on a filter, washed with 20 ml. of water, and finally washed with 20 ml. of a mixture of ethanol and ether (1:9). The crystals were dried at 50° C. for 3 hrs. There was thus obtained 1.17 g. of 3-methoxy-2-oxobutyraldehyde bis(thiosemicarbazone) melting at 208° to 212° C.

*Analysis.*—Calc'd for $C_7H_{14}N_6OS_2$: C, 32.05; H, 5.35; N, 32.05; S, 24.45. Found: C, 32.78; H, 5.49; N, 31.35; S, 24.13.

PREPARATION 3.—PREPARATION OF 3-HYDROXY - 2 - OXOBUTYRALDEHYDE BIS(THIOSEMICARBAZONE)

A solution of 4.12 g. (0.04 mole) of 3-hydroxy-2-oxobutyraldehyde in 20 ml. of 50% aqueous ethanol was added dropwise with stirring to 130 ml. of 5% (w./v.) dilute aqueous acetic acid containing 7.3 g. of thiosemicarbazide that had been heated to 50° C. Stirring and heating at 50° C. was continued until all of the aqueous ethanolic solution of 3-hydroxy-2-oxobutyraldehyde had been added. The reaction mixture became a deep yellow and yellow crystals began to form. The mixture was allowed to cool to about 25° C. slowly with stirring, and was set aside for 5 days. Crystals formed. They were collected on a filter and washed successively with 50 ml. of cold water, 50 ml. of ethanol, and 50 ml. of ether. After drying at about 25° C., 8.0 g. of 3-hydroxy-2-oxobutyraldehyde bis(thiosemicarbazone) was obtained (80% yield).

PREPARATION 4.—3-ETHOXY-2-OXOBUTYRALDEHYDE BIS(THIOSEMICARBAZONE)

The following modification of Preparation 1, Part A provides a higher yield and a purer product by utilizing acetic acid in the reaction medium.

To a filtered solution, prepared by dissolving 33 g. (0.363 mole) of thiosemicarbazide in a mixture of 650 ml. of water and 20 ml. of glacial acetic acid heated to 60° C., was added dropwise at the rate of 1 drop per sec. with vigorous stirring, a 30.7% aqueous solution (also at 60° C.) of 3-ethoxy-2-oxobutyraldehyde hydrate. (The aqueous solution was prepared by dissolving 25.8 g. (0.174 mole) of 3-ethoxy-2-oxobutyraldehyde hydrate in water.) The reaction mixture was heated and stirred for 30 min. after all the solution of aldehyde had been added, and was then cooled to about 25° C. Stirring was continued for about 20 hrs. The crystals that formed were collected on a filter and washed successively with 250 ml. water, 250 ml. ethanol, and 250 ml. ether. After drying the washed crystals in air, there was obtained 82 g. of 3-ethoxy-2-oxobutyraldehyde bis(thiosemicarbazone) (85% yield).

PREPARATION 5.—3-PROPOXY-2-OXOBUTYRALDEHYDE BIS(THIOSEMICARBAZONE)

A solution of 5.76 g. (0.04 mole) of 3-propoxy-2-oxobutyraldehyde in 20 ml. 50% aqueous ethanol (v./v.) was added dropwise with stirring to a solution of 7.3 g. (0.08 mole) thiosemicarbazide in 130 ml. water heated to 50° C. and containing 5% (by volume) acetic acid. The reaction mixture was slowly cooled to about 25° C. while stirring was continued. The crystals of 3-propoxy-2-oxobutyraldehyde bis(thiosemicarbazone) that formed were collected on a filter, washed successively with 50 ml. cold water, 50 ml. ethanol, and 50 ml. diethyl ether and dried.

PREPARATION 6

Following the procedure of Preparation 5, but substituting 5.76 g. 3-isopropoxy-2-oxobutyraldehyde for the 3-propoxy-2-oxobutyraldehyde, there was prepared 3-isopropoxy-2-oxo-butyraldehyde bis(thiosemicarbazone).

PREPARATION 7

Following the procedure of Preparation 1, Part B, but substituting 3-hydroxy-2-oxobutyraldehyde bis(thiosemicarbazone), 3-methoxy-2-oxobutyraldehyde bis(thiosemicarbazone), 3-propoxy-2-oxobutyraldehyde bis(thiosemicarbazone), and 3-isopropoxy-2-oxobutyraldehyde bis(thiosemicarbazone) for 3-ethoxy - 2 - oxobutyraldehyde bis(thiosemicarbazone), there were prepared the disodium salts of 3-hydroxy-2-oxobutyraldehyde bis(thiosemicarbazone), 3-methoxy - 2 - oxobutyraldehyde bis(thiosemicarbazone), 3-propoxy-2-oxobutyraldehyde bis(thiosemicarbazone), and 3-isopropoxy-2-oxobutyraldehyde bis(thiosemicarbazone), respectively.

The corresponding dipotassium salts are prepared by substituting potassium methoxide for sodium methoxide.

PREPARATION 8.—3-ACETOXY-2-OXOBUTYRALDEHYDE BIS(THIOSEMICARBAZONE)

A solution of 14.7 g. (0.16 mole) thiosemicarbazide in a mixture of 245 ml. water and 25 ml. acetic acid, and a solution of 9.2 g. (0.064 mole) 3-acetoxy-2-oxobutyraldehyde in 50 ml. warm water were mixed in a one liter flask fitted with a stirrer, a thermometer, and a reflux condenser. The reaction mixture was heated at 55° C. for 8 hrs. (crystals began to form after about 1 hr.), cooled in an ice bath, and filtered. The filter cake was washed with 200 ml. cold water, dried, and dissolved in 1.5 l. methanol. The methanol solution was heated to boiling and 1.5 l. hot water was added. The solution was concentrated to a volume of about 1 l. by evaporation, and cooled for crystallization. The crystals that formed were collected on a filter and dried under reduced pressure at 100° C. to give 11.2 g. of 3-acetoxy-2-oxobutyraldehyde bis(thiosemicarbazone) having a melting point of 210.3° to 212.1° C.

*Analysis.*—Calc'd. for $C_8H_{14}N_6O_2S_2$: C, 33.09; H, 4.89; N, 28.95; S, 22.09. Found: C, 33.34; H, 4.85; N, 28.18; S, 22.17.

Following the same procedure but substituting 3-propionoxy-2-oxobutyraldehyde, 3-butyryloxy-2-oxobutyraldehyde, and 3-isobutyryloxy-2-oxobutyraldehyde for 3-acetoxy-2-oxobutyraldehyde, there were prepared 3-propionoxy-2-oxobutyraldehyde-, 3-butyryloxy-2-oxobutyraldehyde-, and 3-isobutyryloxy-2-oxobutyraldehyde bis(thiosemicarbazones), respectively.

PREPARATION 9. — 3-ETHOXY - 2-OXOBUTYRALDEHYDE BIS(4 - METHYL - 3-THIOSEMICARBAZONE)

A quantity, 42 g. (0.4 mole) 4-methylthiosemicarbazide was dissolved in 1500 ml. water by heating on a steam bath. The solution was cooled to about 25° C. and mixed with a solution of 50.6 g. (0.2 mole) 3-ethoxy-2-oxobutyraldehyde dissolved in water (about a 58.5% solution). The reaction mixture was kept at about 25° C. for 40 hrs. (a precipitate began to form almost immediately). A cake of the precipitated product on the bottom of the reaction vessel was broken up and the reaction mixture was filtered. The filter cake was dried to give 39.7 g. of yellow solid. The filtrate was acidified with 50 ml. glacial acetic acid, and set aside for 48 hrs. at about 25° C. After filtering, and drying the filter cake, there was obtained 2.9 g. of yellow solid. The 39.7 g. and 2.9 g. of solid were combined and the 42.6 g. total was halved. Each 21.3 g. portion was dissolved in 1 l. absolute methanol by heating to boiling on a steam bath. The hot methanolic solution was filtered, and the filtrate was reheated to boiling. One l. water was added and the aqueous-methanolic solution was heated and then set aside at about 25° C. Crystallization began in about ½ hr. The crystallizing solution was kept at about 25° C. for about 16 hrs., chilled at 4° C. for 6 hrs., and filtered. The crystals from each portion were combined, washed with 3 250-ml. portions water, and dried. There was thus obtained 30 g. of 3-ethoxy-2-oxobutyraldehyde bis(4-methyl-3-thiosemicarbazone) as fine, light-yellow crystals having a melting point of 197° to 199.6° C.

*Analysis.*—Calc'd. for $C_{10}H_{19}ON_6S_2$: C, 39.6; H, 6.3; N, 27.7; S, 21.1. Found: C, 39.6; H, 6.4; N, 27.6; S, 21.2.

Following the same procedure but substituting 3-hydroxy - 2 - oxobutyraldehyde, 3-methoxy-2-oxobutyraldehyde, 3-propoxy-2-oxobutyraldehyde, 3-isopropoxy-2-oxobutyraldehyde, 3-acetoxy-2-butyraldehyde, 3-propionoxy-2 - oxobutyraldehyde, 3-butyryloxy-2-oxobutyraldehyde, and 3-isobutyryloxy-2-oxobutyraldehyde for 3-ethoxy-2-oxobutyraldehyde, there were prepared 3-hydroxy-2-oxobutyraldehyde bis(4-methyl-3-thiosemicarbazone), 3-methoxy-, 3-propoxy-, 3-isopropoxy-, 3-acetoxy-, 3-propionoxy-, 3-butyryloxy-, and 3-isobutyryloxy-2-oxobutyraldehyde bis(4-methyl-3-thiosemicarbazone), respectively.

PREPARATION 10

Following the procedure of Preparation 1, Part B but substituting 3 - propionoxy - 2-oxobutyraldehyde bis(thiosemicarbazone), 3-butyryloxy-2-oxobutyraldehyde bis(thiosemicarbazone), and 3-isobutyryloxy-2-oxobutyraldehyde bis(thiosemicarbazone) for 3-ethoxy-2-oxobutyraldehyde bis(thiosemicarbazone), there were prepared the corresponding disodium salt of each of the 3-alkanoyloxy-2-oxobutyraldehyde bis(thiosemicarbazone) named.

PREPARATION 11.—ZINC CHELATE OF 3-ETHOXY-2 - OXOBUTYRALDEHYDE BIS(THIOSEMICARBAZONE)

To a solution of 4.4 g. (0.016 mole) of 3-ethoxy-2-oxobutyraldehyde bis(thiosemicarbazone) in 90 ml. of of boiling methanol was added a solution of 3.5 g. (0.016 mole) of zinc acetate dihydrate in 40 ml. of warm methanol. An orange color formed immediately. After removing most of the methanol by evaporation at 45° C. 200 ml. of ether was added. A solid formed that was separated from the ether, washed with another 40 ml. of ether, and dried. There was thus obtained 3.87 g. of the zinc chelate of 3-ethoxy-2-oxobutyraldehyde bis(thiosemicarbazone).

The initial 200 ml. portion of ether and the 40 ml. ether wash were combined and concentrated by evaporation. The concentrate was washed with ether and dried as described above. In this way another 2.16 g. of the zinc chelate was obtained.

The ultraviolet spectra of both crops were similar. The total yield was, therefore, 6.03 g. (94% yield). Elemental analysis indicated the chelate was in the form of a monoacetate.

*Analysis.*—Calc'd for $C_{10}H_{17}N_6O_3S_2Zn$ (M.W. 398.5): C, 30.1; H, 4.3; N, 21.1; S, 16.1; Zn, 16.4. Found: C, 30.0; H, 5.0; N, 20.4; S, 15.5; Zn, 17.7.

In similar manner the corresponding zinc chelates of 3-methoxy-2-oxobutyraldehyde bis(thiosemicarbazone),
3-hydroxy-2-oxobutyraldehyde bis(thiosemicarbazone),
3-propoxy-2-oxobutyraldehyde bis(thiosemicarbazone),
3-isopropoxy-2-oxobutyraldehyde bis(thiosemicarbazone),
3-acetoxy-2-oxobutyraldehyde bis(thiosemicarbazone),
3-propionoxy-2-oxobutyraldehyde bis(thiosemicarbazone,
3-butyryloxy-2-oxobutyraldehyde bis(thiosemicarbazone),
3-propionoxy-2-oxobutyraldehyde bis(thiosemicarbazone),
3-ethoxy-2-oxobutyraldehyde bis(4-methyl-3-thiosemicarbazone),
3-hydroxy-2-oxobutyraldehyde bis(4-methyl-3-thiosemicarbazone), and
3-acetoxy-2-oxobutyraldehyde bis(4-methyl-3-thiocarbazone), are prepared by substituting equimolar amounts of each compound named for 3-ethoxy-2-oxobutyraldehyde bis-(thiosemicarbazone).

PREPARATION 12.—CUPRIC CHELATE OF 3-ETHOXY-2 - OXOBUTYRALDEHYDE BIS(THIOSEMICARBAZONE)

A suspension consisting of 4.4 g. (0.016 mole) of 3-ethoxy-2-oxobutyraldehyde bis(thiosemicarbazone) in 100 ml. of 95% aqueous ethanol was mixed with a suspension consisting of 3.2 g. (0.016 mole) cupric acetate monohydrate in 100 ml. of 95% aqueous ethanol. A black suspension resulted. The suspension was heated to boiling, and the insoluble material was separated by centrifugation and decantation. An additional 100 ml. of 95% aqueous ethanol was added to the solid and, after heating to the boiling temperature, a small amount of insoluble material was discarded. The two solutions were combined and allowed to stand at about 25° C. for 24 hrs. A dark brown precipitate that formed was collected on a filter, washed with cold ethanol, washed with ether, dried under reduced pressure, and finally dried at 66° C. for 5 min. There was thus obtained 3.47 g. of the cupric chelate of 3-ethoxy-2-oxobutyraldehyde bis(thiosemicarbazone).

The original 95% aqueous ethanol filtrate and the ethanol and ether washes were combined and evaporated to dryness. The residue was dried at 66° C. for 6 hrs. to give 1.73 g. of product. The total yield was 5.2 g. (96%).

*Analysis.*—Calc'd for $C_8H_{14}CuN_6OS_2$ (M.W. 337.7): C, 28.4; H, 4.1; Cu, 18.8; N, 24.9; S, 19.0. Found: C, 28.8; H, 4.4; Cu, 19.0; N, 23.7; S, 19.5.

In similar manner the corresponding cupric chelates are prepared by substituting equimolar amounts of 3-methoxy-2-oxobutyraldehyde bis(thiosemicarbazone),
3-hydroxy-2-oxobutyraldehyde bis(thiosemicarbazone),
3-propoxy-2-oxobutyraldehyde bis(thiosemicarbazone),
3-isopropoxy-2-oxobutyraldehyde bis(thiosemicarbazone),
3-acetoxy-2-oxobutyraldehyde bis(thiosemicarbazone),
3-propionoxy-2-oxobutyraldehyde bis(thiosemicarbazone),
3-butyryloxy-2-oxobutyraldehyde bis(thiosemicarbazone),
3-isobutyryloxy-2-oxobutyraldehyde bis(thiosemicarbazone),
3-ethoxy-2-oxobutyraldehyde bis(4-methyl-3-thiosemicarbazone),
3-hydroxy-2-oxobutyraldehyde bis(4-methyl-3-thiosemicarbazone), and
3-acetoxy-2-oxobutyraldehyde bis(4-methyl-3-thiosemicarbazone), respectively, for 3-ethoxy-2-oxobutyraldehyde bis(thiosemicarbazone).

PREPARATION 13.—CUPROUS CHELATE OF 3-ETHOXY - 2 - OXOBUTYRALDEHYDE BIS(THIOSEMICARBAZONE)

A solution consisting of 1.1 g. (0.004 mole) of 3-ethoxy-2-oxobutyraldehyde bis(thiosemicarbazone) in 40 ml. of boiling methanol was mixed with a solution consisting of 0.8 g. (0.008 mole) of cuprous chloride in 40 ml. of 50% aqueous ethanol acidified with just enough hydrochloric acid added dropwise to cause solution. The reaction mixture was heated to about 80° to 90° C. on a steam bath for 5 to 10 min., cooled to about 25° C., and refrigerated at 5° C. for 2 hrs. The crystals that formed were collected by centrifugation and the solvent medium was decanted. After washing the crystals with 20 ml. each of water, ethanol, and ether, and drying there was obtained 1.56 g. of the cuprous chelate of 3-ethoxy-2-oxobutyraldehyde bis(thiosemicarbazone) as light brown crystals.

In similar manner the corresponding cuprous chelates are prepared by substituting equimolar amounts of 3-methoxy-2-oxobutyraldehyde bis(thiosemicarbazone),
3-hydroxy-2-oxobutyraldehyde bis(thiosemicarbazone),
3-propoxy-2-oxobutyraldehyde bis(thiosemicarbazone),
3-isopropoxy-2-oxobutyraldehyde bis(thiosemicarbazone),
3-acetoxy-2-oxobutyraldehyde bis(thiosemicarbazone),
3-propionoxy-2-oxobutyraldehyde bis(thiosemicarbazone),
3-butyryloxy-2-oxobutyraldehyde bis(thiosemicarbazone),
3-isobutyryloxy-2-oxobutyraldehyde bis(thiosemicarbazone),
3-ethoxy-2-oxobutyraldehyde bis(4-methyl-3-thiosemicarbazone),
3-hydroxy-2-oxobutyraldehyde bis(4-methyl-3-thiosemicarbazone), and
3-acetoxy-2-oxobutyraldehyde bis(4-methyl-3-thiosemicarbazone), respectively, for 3-ethoxy-2-oxobutyraldehyde bis(thiosemicarbazone).

PREPARATION 14.—NICKEL CHELATE OF 3-ETHOXY-2-OXOBUTYRALDEHYDE BIS(THIOSEMICARBAZONE)

A solution consisting of 0.58 g. (0.002 mole) of nickel nitrate hexahydrate $[Ni(NO_3)_2 \cdot 6H_2O]$ in 25 ml. of warm 95% aqueous ethanol was mixed with a solution consisting of 0.56 mg. of 3-ethoxy-2-oxobutyraldehyde bis(thiosemicarbazone) in 25 ml. of boiling 95% aqueous ethanol. A greenish-black solution was obtained. The solution was poured into a separatory funnel containing 50 ml. of ether and 100 ml. of water. The ether phase became dark green and was separated. The aqueous phase was further extracted with two 50 ml. portions of ether; and the ether extracts were combined, washed with water, and dried over anhydrous sodium sulfate. After evaporating the ether there was obtained 620 mg. (93% yield) of the nickel chelate of 3-ethoxy-2-oxobutyraldehyde bis(thiosemicarbazone) as dark, almost black, crystals.

*Analysis.*—Calc'd for $C_8H_{14}N_6NiOS_2$ (M.W. 332.8): C, 28.8; H, 4.2; N, 25.2; Ni, 17.6; S, 19.3. Found: C, 29.6; H, 4.4; N, 24.6; Ni, 17.3; S, 18.5.

In similar manner the corresponding nickel chelates are prepared by substituting equimolar amounts of 3-methoxy-2-oxobutyraldeyde bis(thiosemicarbazone),
3-hydroxy-2-oxobutyraldehyde bis(thiosemicarbazone),
3-propoxy-2-oxobutyraldehyde bis(thiosemicarbazone),
3-isopropoxy-2-oxobutyraldehlde bis(thiosemicarbazone),
3-acetoxy-2-oxobutyraldehyde bis(thiosemicarbazone),
3-propionoxy-2-oxobutyraldehyde bis(thiosemicarbazone),
3-butyryloxy-2-oxobutyraldehyde bis(thiosemicarbazone),
3-isobutyryloxy-2-oxobutyraldehyde bis(thiosemicarbazone),
3-ethoxy-2-oxobutyraldehyde bis(4-methyl-3-thiosemicarbazone),
3-hydroxy-2-oxobutyraldehyde bis(4-methyl-3-thiosemicarbazone), and
3-acetoxy-2-oxobutyraldehyde bis(4-methyl-3-thiosemicarbazone), respectively, for 3-ethoxy-2-oxobutyraldehyde bis(thiosemicarbazone).

*Example 1*

Four cages each providing a total of 512 in.³ of free space were stocked with substantially equal numbers of incubating Mexican fruit fly eggs, *Anastrepha ludens* Loew. The stocked cages were kept in an exhaust-ventilated room at about 25° C. When the eggs began to hatch, a synthetic diet was provided the newly emerged larvae. The basic diet consisting of 4 parts granulated sugar and 1 part orange juice crystals was fed to the larvae in one cage maintained at normal controls. The larvae in the other three were fed 0.01 percent, 0.05 percent, and 0.1 percent levels of 3-ethoxy-2-oxobutyraldehyde bis(thiosemicarbazone), respectively, in the basic diet. Feeding was continued over an interval of 20 consecutive days. The female flies were stripped of eggs at 13 and 20 days of age and the eggs were incubated and hatchability noted. Further evaluation of the effects of 3-ethoxy-2-oxobutyraldehyde bis(thiosemicarbazone) was obtained by observing adult egg production. Egg production of these females was normal.

The female flies fed diets containing 0.05 percent and 0.1 percent 3-ethoxy-2 - oxobutyraldehyde bis(thiosemicarbazone) produced no hatchable eggs. At the 0.01 percent concentration hatchability was about 1.3 percent.

*Example 2*

Adult screw-worm flies, *Cochliomyia hominivorax* Coquerel, were fed, beginning not over 24 hours from emergence, a freshly prepared sugar syrup containing 1 percent 3-methoxy-2-oxobutyraldehyde bis(thiosemicarbazone) for 5 days. On the 8th day, the females were permitted to deposit their eggs, and the eggs were incubated for determination of percentage hatchability. The female flies so treated were not very prolific egg producers and only 2 percent (expressed as percentage of control female flies which laid eggs) were functional. None, of the few eggs laid, hatched.

*Example 3*

Two populations of about 300 to 500 house flies, *Musca domestica* Linnaeus, were treated and observed as follows: One population was fed a dry diet consisting of 6 parts powdered milk, 6 parts sugar, and 1 part powdered egg. Water was also provided in a separate dish ad libitum. The other population was fed 0.1 percent 3-ethoxy-2-oxobutyraldehyde bis(thiosemicarbazone) in the same basic diet with water ad libitum. After the female flies of both populations had laid their eggs (7 to 9 days after the experiment began), 0.06 g. of eggs from each population was incubated to hatching. The eggs from the normal untreated population hatched substantially 100 percent, whereas the 3-ethoxy-2-oxobutyraldehyde bis(thiosemicarbazone) treated population hatched only 1 percent.

*Example 4*

In a field test, 10 kg. of a diluent carrier consisting of 6 parts powdered milk, 6 parts corn syrup, and 1 part powdered egg and water was thoroughly mixed with 10 g. of the zinc chelate of 3-ethoxy-2-oxobutyraldehyde bis(thiosemicarbazone) and portions were spread out in shallow pans placed at various sites in a large, relatively isolated, dairy feed lot and barn. Within 3 months, the population of house flies and face flies had declined to the point that very few were seen on the premises.

*Example 5*

A 4' x 6' plot of 28-day old bean plants was thoroughly sprayed with a wettable powder spray containing 1 percent of the disodium salt of 3-ethoxy-2-oxobutyraldehyde bis(thiosemicarbazone). After the leaves had dried, adult strawberry spider mites, *Tetranychus atlanticus*, were released on the leaves in numbers sufficient to infest the plants. The plants were carefully inspected daily for eggs, young mites, and the adults. After 5 to 7 days, few young mites were found, several plants having eggs deposited on the leaves removed for observation did not hatch, and the population of adult mites was decreasing. Within 3 weeks the plot was substantially free of the spider mites.

I claim:
1. The process which comprises poisoning insects with a member selected from the group consisting of: (1) 3-substituted-2 - oxobutyraldehyde bis(thiosemicarbazones) of the formula:

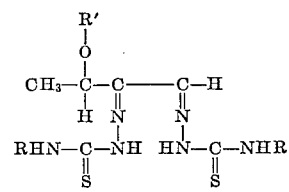

wherein R is selected from the group consisting of hydrogen and methyl, and R' is selected from the group consisting of hydrogen, methyl, ethyl, propyl, isopropyl, acetyl, propionyl, butyryl, and isobutyryl; (2) alkali metal salts thereof; and (3) metal chelates thereof.

2. The process according to claim 1 wherein the poisoned insects are made reproductively sterile.

3. The process according to claim 1 wherein dipterous insects are poisoned.

4. The process according to claim 3 wherein the poisoned dipterous insects are made reproductively sterile.

5. The process which comprises poisoning insects with a composition comprising an insect nutriment, a carrier diluent, and a member selected from the group consisting of: (1) 3-substituted-2 - oxobutyraldehyde bis(thiosemicarbazone) of the formula:

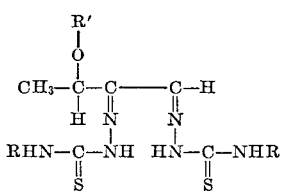

wherein R is selected from the group consisting of hydrogen and methyl, and R' is a member selected from the group consisting of hydrogen, methyl, ethyl, propyl, isopropyl, acetyl, propionyl, butyryl, and isobutyryl; (2) alkali metal salts thereof; and (3) metal chelates thereof.

6. The process according to claim 5 wherein the nutriment is a carbohydrate.

7. The process according to claim 3 wherein house flies, *Musca domestica* Linnaeus, are poisoned.

8. The process according to claim 7 wherein the poisoned house flies are made reproductively sterile.

9. The process which comprises poisoning insects with 3-ethoxy-2-oxobutyraldehyde bis(thiosemicarbazone).

10. Composition for poisoning insects which comprises a carrier diluent comprising an insect nutriment and from about 0.01 to about 5.0 percent of an essential active ingredient selected from the group consisting of: (1) 3-substituted-2-oxobutyraldehyde bis(thiosemicarbazone) of the formula:

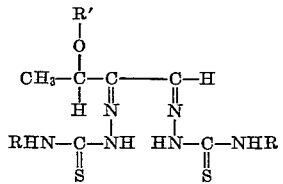

wherein R is selected from the group consisting of hydrogen and methyl, and R' is a member selected from the group consisting of hydrogen, methyl, ethyl, propyl, isopropyl, acetyl, propionyl, butyryl, and isobutyryl; (2) alkali metal salts thereof; and (3) metal chelates thereof.

11. Composition according to claim 10 and an insect attractant.

12. Composition for poisoning dipterous insects which comprises a carrier diluent comprising powdered milk, sugar, and powdered egg, and an essential active ingredient selected from the group consisting of: (1) 3-substituted-2 - oxobutyraldehyde bis(thiosemicarbazone) of the formula:

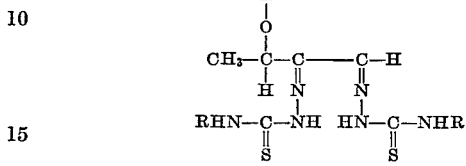

wherein R is selected from the group consisting of hydrogen and methyl, and R' is a member selected from the group consisting of hydrogen, methyl, ethyl, propyl, isopropyl, acetyl, propionyl, butyryl, and isobutyryl; (2) alkali metal salts thereof; and (3) metal chelates thereof.

No references cited.

LEWIS GOTTS, *Primary Examiner.*

SHEP K. ROSE, *Assistant Examiner.*